Patented Apr. 4, 1939

2,153,513

UNITED STATES PATENT OFFICE 2,153,513

REACTION PRODUCTS OF 2-METHYL-1,3-DICHLOROPROPANE AND ALCOHOLS

Gerald H. Coleman and Garnett V. Moore, Midland, Mich., assignors to The Dow Chemical Company, Midland, Mich., a corporation of Michigan No Drawing. Application November 20, 1936, Serial No. 111,906

12 Claims. (Cl. 260—614)

This invention concerns new organic ether products and a method for preparing the same.

We have discovered that when an alcohol is reacted with 2-methyl-1,3-dichloropropane in the presence of a suitable basic material, useful liquid ether products are formed. We have prepared various ethers according to the above method, determined certain of their physical properties whereby they can be readily identified, and have found them useful as general solvents, extractants, plasticizers, and intermediates for the preparation of complex organic compounds.

In carrying out our invention, an alcohol, 2-methyl-1,3-dichloropropane, and a suitable basic material such as sodium hydroxide are maintained at a reaction temperature until the desired conversion is obtained. Sodium chloride formed during the reaction is separated from the reacted mixture, which is thereafter fractionally distilled to obtain the desired ether products. The reaction temperature varies with the particular reactants employed and the proportions thereof present, but it is generally between about 75° C. and the decomposition temperature of the mixture. The time required for carrying out the process is dependent upon the reactants employed, the temperature of the reaction, and the type of ether product desired, substantial quantities of ether products being generally formed after about 1 to 12 hours of heating at reaction temperature. The process may be conveniently carried out at atmospheric pressure, and when an excess of a lower boiling alcohol is employed in the reaction, at the reflux temperature of the mixture. If desired, however, elevated pressures and temperatures may be employed.

Regardless of the proportions of the reactants employed and the temperatures and pressures under which they are maintained, 3 types of ether products are formed in the above described procedure. The following equation shows a reaction of 2-methyl-1,3-dichloropropane with normal propanol and is illustrative of the course of the reaction and the type of compounds obtained thereby:

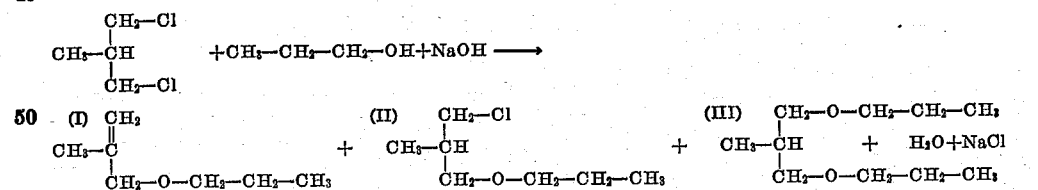

Formula I above is the normal propyl ether of 2-methyl-3-hydroxy-propene-1; II is the normal propyl ether of 2-methyl-3-chloropropanol-1; and III is the di-propyl ether of 2-methylpropandiol-1,3. The amounts of the above products formed in the reaction vary with time and temperature of reaction and the proportions of reactants employed.

The following examples are illustrative of the procedure followed and the products obtained thereby, but are not to be construed as limiting the invention:

Example 1

1270 grams (10 mols) of 2-methyl-1,3-dichloropropane, 800 grams (25 mols) of methyl alcohol, and 800 grams (20 mols) of sodium hydroxide were mixed together and maintained at the refluxing temperature of the mixture, i. e. 77°–89° C., for a period of 2 hours. The reaction mixture was then washed with 3 liters of water to dissolve out sodium chloride formed in the reaction, and the oil layer separated and fractionally distilled, whereby there was obtained 268 grams (2.11 mols) of unreacted 2-methyl-1,3-dichloropropane, 353 grams (4.1 mols) of crude methyl ether of 2-methyl-3-hydroxy-propene-1, 278 grams (2.27 mols) of crude methyl ether of 2-methyl-3-chloropropanol-1, and a small amount of higher boiling product. Upon refractionation of the above ether products, the methyl ether of 2-methyl-3-hydroxy-propene-1 was found to be a free-flowing water-white liquid boiling at 65–7° C., and having a specific gravity of 0.793 at 20°/4° C. The methyl ether of 2-methyl-3-chloropropanol-1 is a water-white liquid boiling at 123–4° C. and having a specific gravity of 0.982 at 20°/4° C. The higher boiling fraction containing the di-methyl ether of 2-methyl-propandiol-1,3 was not purified.

Example 2

A mixture of 127 grams (1 mol) of 2-methyl-1,3-dichloropropane, 90 grams (2.25 mols) of sodium hydroxide, and 150 grams (2.5 mols) of 100% normal propanol was heated to 150° C. and under the vapor pressure of the reactants for 8 hours in a high-pressure rocker bomb. The reaction mixture was then washed with water and distilled, whereby there was obtained 35 grams (0.304 mol) of the normal propyl ether of 2-methyl-3-hydroxy-propene-1, which is a compound boiling at 112°-114° C., and having a specific gravity of 0.798 at 20°/4° C.; 23 grams (0.153 mol) of the normal propyl ether of 2-methyl-3-chloropropanol-1, which boils at 97°-100° C. at 100 millimeters pressure, and has a specific gravity of 0.964 at 20°/4° C.; and 28 grams (0.161 mol) of the di-normal-propyl ether of 2-methyl-propandiol-1,3, which boils between 111 C. and 113° C. at 54 millimeters pressure, and has a specific gravity of 0.855 at 20°/4° C.

2 grams of an ethyl cellulose product having a 48.8% ethoxy content and a viscosity of 17 centipoises was contacted with a mixture of 18 grams of the di-normal-propyl ether of 2-methyl-propandiol-1,3 and 5 grams of ethyl alcohol. The resulting clear solution was free from gels, of medium viscosity, and well adapted for use in film formation.

Example 3

A reaction mixture identical with that disclosed in Example 2 was refluxed for 8 hours at a temperature of 83.5°-85° C., and salt subsequently removed from the reaction product by washing with water. There was obtained 65 grams (0.565 mol) of normal-propyl ether of 2-methyl-3-hydroxy-propene-1; 15 grams (0.1 mol) of normal-propyl ether of 2-methyl-3-chloro-propanol-1; and 25 grams (0.144 mol) of the di-normal-propyl ether of 2-methyl-propandiol-1,3.

Example 4

A mixture consisting of 254 grams (2 mols) of 2-methyl-1,3-dichloro-propane, 245 grams (4 mols) of 98% isopropyl alcohol, and 200 grams (5 mols) of sodium hydroxide was heated to 125° C. and under the vapor pressure of the reaction mixture for a period of 5 hours in a high pressure rocker bomb. The product was thereafter washed from the bomb, filtered, and the salt dissolved out of the reaction product by washing with water. The reaction product was fractionally distilled to recover crude isopropyl ether of 2-methyl-3-hydroxy-propene-1, a small amount of di-isopropyl ether of 2-methyl-propandiol-1,3, and the isopropyl ether of 2-methyl-3-chloro-propanol-1 which is a water white liquid boiling at 90° to 92° C. at 100 millimeters pressure, and having a specific gravity of 0.944 at 20°/4° C.

Example 5

A mixture of 127 grams (1 mol) of 2-methyl-1,3-dichloro-propane, 90 grams (2.25 mols) of sodium hydroxide, and 185 grams (2.5 mols) of normal butyl alcohol was refluxed for 8 hours at a temperature of 109°-112° C. The product was washed with water, dried, and distilled whereby there was obtained 13 grams (0.1 mol) of the normal butyl ether of 2-methyl-3-hydroxy-propene-1, which boils at 60°-65° C. at 50 millimeters pressure; 40 grams (0.243 mol) of the normal butyl ether of 2-methyl-3-chloro-propanol-1 which is a water white liquid boiling at 100-2° C. at 50 millimeters pressure, and having a specific gravity of 0.944 at 20°/4° C.; and 35.5 grams (0.176 mol) of di-normal butyl ether of 2-methyl-propandiol-1,3, which boils at 139.5-142° C. at 50 millimeters pressure, and has a specific gravity of 0.856 at 20°/4° C.

Example 6

In a similar manner 127 grams (1 mol) of 2-methyl-1,3-dichloro-propane, 90 grams (2.25 mols) of sodium hydroxide, and 255 grams (2.5 mols) of normal hexyl alcohol were refluxed for 8 hours at a temperature of 124°-127° C. The reaction product was washed with water, dried, and distilled, whereby there was obtained 10 grams (0.064 mol) of the normal hexyl ether of 2-methyl-3-hydroxy-propene-1, boiling between 110° and 120° C. at 60 millimeters pressure; 42 grams (0.218 mol) of the normal hexyl ether of 2-methyl-3-chloro-propanol-1, a water white compound boiling at 132°-133° C. at 50 millimeters pressure, and having a specific gravity of 0.927 at 20°/4° C.; and 44 grams (0.171 mol) of di-normal hexyl ether of 2-methyl-propandiol-1,3, which boils at 140°-141° C. at 6 millimeters pressure, and has a specific gravity of 0.857 at 20°/4° C.

Example 7

127 grams (1 mol) of 2-methyl-1,3-dichloro-propane, 90 grams (2.25 mols) of sodium hydroxide, and 250 grams (2.5 mols) of cyclohexanol were mixed together and refluxed at 126°-129° C. for 8 hours. The reaction product was subsequently washed with water and distilled whereby there was obtained 33 grams (0.174 mol) of cyclohexyl ether of 2-methyl-3-chloro-propanol-1, a liquid ether product boiling at 140°-142° C. at 50 millimeters pressure, and having a specific gravity of 1.019 at 20°/4° C.; 28 grams (0.11 mol) of di-cyclo-hexyl ether of 2-methyl-propandiol-1,3, which is a colorless oil boiling between 150° and 160° C. at 7 millimeters pressure, and having the specific gravity 1.000 at 20°/4° C. Approximately 13 grams of the cyclo-hexyl ether of 2-methyl-3-hydroxy-propene-1 was present in a constant boiling mixture of unreacted cyclohexyl alcohol as a low boiling fraction.

Example 8

381 grams (3 mols) of 2-methyl-1,3-dichloro-propane, 372 grams (6.0 mols) of ethylene glycol, and 260 grams (6.5 mols) of sodium hydroxide were mixed together and gradually warmed from 30 C. up to 118° C. over a period of 55 minutes, and thereafter maintained at a temperature ranging between 115° and 120° C. for a period of 1 hour and 5 minutes. The reaction mixture was thereafter washed with water to remove sodium chloride, and the wash water so obtained steam-distilled to recover small portions of products dissolved therein. The oily steam distillate and washed reaction product were then combined and fractionally distilled whereby there was obtained 173 grams (1.49 mols) of the hydroxy-ethyl ether of 2-methyl-3-hydroxy-propene-1, which boils at 94°-95° C. at 48 millimeters pressure, and has a specific gravity of 0.936 at 20°/4° C.; 55 grams (0.36 mol) of the hydroxy-ethyl ether of 2-methyl-3-chloro-propanol-1, a compound boiling at 134°-136° C. at 50 millimeters pressure, and having a specific gravity of 1.084 at 20°/4° C., and 40 grams of a higher boiling fraction comprising the di-(hydroxy-ethyl) ether of 2-methyl-propandiol-1,3, and other complex reaction products. This high boiling fraction had a specific gravity of approximately 1.07 at 20°/4° C.

Example 9

127 grams (1 mol) of 2-methyl-1,3-dichloro-propane; 108 grams (1 mol) of benzyl alcohol; and 40 grams (1 mol) of sodium hydroxide were reacted together at a temperature of 100° to 105° C. for 8 hours. The reaction product was thereafter washed with water, dried, and fractionally distilled, whereby there was obtained 33.6 grams (0.169 mol) of the benzyl ether of 2-methyl-3-chloro-propanol-1, which boils at 110°–112° C. at 5 millimeters pressure, and has a specific gravity of 1.067 at 20°/4° C.; and 23 grams (0.09 mol) of the dibenzyl ether of 2-methyl-propandiol-1,3, a compound boiling at 170–2° C. at 2.5 millimeters pressure, and having a specific gravity of 1.046 at 20°/4° C. Approximately 19.3 grams of the benzyl ether of 2-methyl-3-hydroxy-propene-1 was obtained along with 68 grams (0.535 mol) of unreacted 2-methyl-1,3-dichloro-propane as a constant boiling mixture.

Other alcohols such as ethyl alcohol, amyl alcohol, octyl alcohol, propylene glycol, phenyl-ethyl alcohol, etc., may be reacted with 2-methyl-1,3-dichloro-propane in a similar manner to produce compounds such as the ethyl ether of 2-methyl-3-chloro-propanol; the di-amyl ether of 2-methyl-propandiol-1,3; the octyl ether of 2-methyl-3-hydroxy propene-1; the 2-hydroxy-propyl ether of 2-methyl-3-chloro-propanol-1; the di-(phenyl-ethyl) ether of 2-methyl-propan-diol-1,3; etc. Other alkaline materials such as sodium carbonate, potassium hydroxide, sodium alcoholate, etc., may be substituted for sodium hydroxide in the process.

The compounds with which this application is particularly concerned have the following formula:

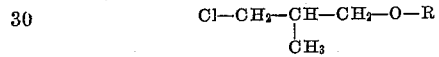

wherein R represents a group selected from the class consisting of the alkyl, aralkyl, cycloalkyl, and hydroxy alkyl radicals.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. A method for the preparation of organic ether products comprising reacting 2-methyl-1,3-dichloro-propane with an alcohol and a basic alkali metal compound.

2. In a method for the preparation of organic ether products, the step which comprises reacting a mixture consisting of an alcohol, 2-methyl-1,3-dichloro-propane, and a basic alkali metal compound to a temperature between 75° C. and the decomposition temperature of the reaction mixture.

3. A method for the preparation of organic ether products comprising reacting 2-methyl-1,3-dichloro-propane with an unsubstituted alcohol in the presence of sodium hydroxide.

4. A method for the preparation of organic ether products having the formula,

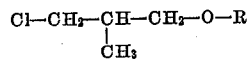

wherein R represents a group selected from the class consisting of the alkyl, aralkyl, cyclo-alkyl, and hydroxy-alkyl radicals which comprises reacting 2-methyl-1,3-dichloro-propane with an unsubstituted alcohol in the presence of a basic alkali metal compound.

5. A method for the preparation of liquid organic ether products comprising reacting 2-methyl-1,3-dichloropropane with a primary alcohol in the presence of a basic alkali metal compound.

6. A method for the preparation of the methyl ether of 2-methyl-3-chloro-propanol comprising reacting 2-methyl-1,3-dichloro-propane with methyl alcohol in the presence of sodium hydroxide.

7. An ether compound having the formula,

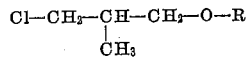

wherein R represents a group selected from the class consisting of the alkyl, aralkyl, cyclo-alkyl, and hydroxy-alkyl radicals.

8. Methyl ether of 2-methyl-3-chloro-propanol-1.

9. A compound obtained by the reaction of 2-methyl-1,3-dichloro-propane with an alcohol and a basic alkali metal compound at a temperature between 75° C. and the decomposition temperature of the reaction mixture and having the formula

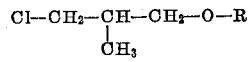

wherein R represents a group selected from the class consisting of the alkyl, aralkyl, cycloalkyl and hydroxy-alkyl radicals.

10. Liquid ether compounds having the formula

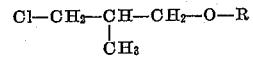

wherein R represents an alkyl group containing from 1 to 8 carbon atoms, inclusive.

11. An ether compound having the formula

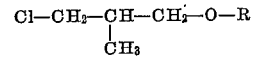

wherein R represents a normal alkyl radical.

12. The benzyl ether of 2-methyl-3-chloro-propanol-1.

GERALD H. COLEMAN.
GARNETT V. MOORE.